C. P. STEWART.
DECORTICATING MACHINE.
APPLICATION FILED APR. 25, 1917.

1,308,267.

Patented July 1, 1919.
5 SHEETS—SHEET 1.

FIG. 1.

Inventor
Charles P. Stewart,
By C. E. Sauge,
Attorney

C. P. STEWART.
DECORTICATING MACHINE.
APPLICATION FILED APR. 25, 1917.

1,308,267.

Patented July 1, 1919.
5 SHEETS—SHEET 2.

UNITED STATES PATENT OFFICE.

CHARLES P. STEWART, OF WALLA WALLA, WASHINGTON.

DECORTICATING-MACHINE.

1,308,267. Specification of Letters Patent. Patented July 1, 1919.

Application filed April 25, 1917. Serial No. 164,562.

*To all whom it may concern:*

Be it known that I, CHARLES P. STEWART, citizen of the United States, residing at Walla Walla, in the county of Walla Walla and State of Washington, have invented certain new and useful Improvements in Decorticating-Machines, of which the following is a specification.

My invention relates to a decorticating machine and has as its principal object the provision of an efficient and practical machine for separating the fibers of leaves of banana palms and Manila palms, as well as other fibrous leaves and stalks from the pulp and other material ordinarily adhering thereto.

Further objects of my invention will be clear to those skilled in this art by an inspection of the following specification and will be more particularly pointed out in the claims.

In the accompanying drawings,

Fig. 8 is a sectional elevation of certain of the parts shown in Fig. 3, illustrating the manner of assembling the scraping roll on the shaft. Fig. 8 is taken at right angles to Fig. 3.

Throughout the separate views, the same part is designated by the same reference character.

Figure 8:
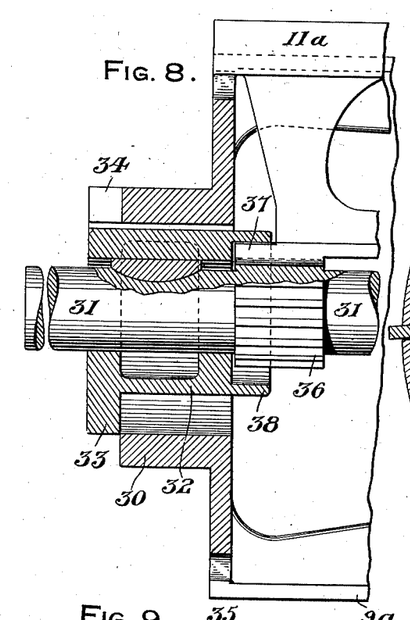

Referring more particularly to the drawings, 1—$1^a$, 2—$2^a$, 3—$3^a$, 4—$4^a$, and 5—$5^a$ are successive pairs of crushing rollers through which the material to be treated is fed, the material entering first between the rolls 1—$1^a$. The various sets of rolls just mentioned are mounted in a suitable frame indicated in outline in Figs. 6 and 7, the spacing between the rolls of each pair being decreased in the direction of travel of the material to be treated. Moreover, the upper roll of each pair has its journal backed by rubber so that it may give somewhat as the material passes through, but will maintain a pressure on the material. The rolls 3—$3^a$ are driven at a faster rate of speed than the rolls 1—$1^a$, 2—$2^a$ and 4—$4^a$ in order to give the material a preliminary rubbing prior to the treatment given by the main scraping rolls. The rubber backing for the rolls $1^a$, $2^a$, $3^a$, $4^a$ and $5^a$ is indicated at $1^b$, $2^b$, $3^b$, $4^b$, and $5^b$ respectively. The rolls 1—$1^a$, 2—$2^a$, 4—$4^a$ and 5—$5^a$ act as holding rolls as well as crushing rolls. It will be noticed, moreover that the rolls 1—$1^a$ and 3—$3^a$, are corrugated longitudinally while the rolls 2—$2^a$ and 4—$4^a$ are corrugated circumferentially, the rolls 1—$1^a$ and 3—$3^a$ serving to feed the material as well as hold and crush the same, whereas the rolls 2—$2^a$ and 4—$4^a$ have a shredding action owing to the circumferential corrugations thereon. The rolls 5—$5^a$ have smooth surfaces acting as crushing rolls and associated with the vertical shaft 5—$5^a$ is a third roller $5^c$ forming with 5 a horizontal pair of rolls, the path of the material being curved around from the pair 5—$5^a$ to the pair 5—$5^c$, a hinged guide 6 serving to assist the material in making the bend. It will be seen that the member 6 has a curved inner surface and is hinged at 6'. The roll $5^c$ is provided with a rubber backing $5^d$, the backing $5^d$ and $5^b$ being adjustable as clearly shown in Fig. 1. Extending in a vertical line below the rolls 5—$5^c$ are the scraper rolls 8—$8^a$ and $8^b$. The scraper rolls are shown somewhat in detail in Figs. 2, 3, 8 and 10, those shown in Figs. 3 and 8 being modified slightly from those shown in Figs. 1 and 2. In all the forms, the rolls have the general outline of cylinders provided with longitudinal slots, the slots in Figs. 1 and 2 having radial sides and being designated as 9, whereas the slots in Figs. 3 and 8 enlarge as they pass radially inward in order to provide room for the rocking of the scraper blades shown in the figures. Associated with each scraper cylinder 8—$8^a$ and $8^b$ is a concave structure adapted to coöperate with scraper 11 carried by the roll for the purpose of working the material. The individual concave elements of which there are a plurality in each concave structure are indicated as 10—$10^a$ and $10^b$ in the concave structures corresponding to the cylinder rolls 8—$8^a$ and $8^b$ respectively. The inner faces of the members 10—$10^a$ and $10^b$ are concentric with the outer faces of the rolls 8—$8^a$ and $8^b$ and are yieldingly mounted so that the scraper knives such as 11 may effectively work the material without damaging the same. Mounted on a pivot or hinge at the upper ends of each concave structure is a coöperating member such as 12, the members 12 serving not only to scrape the holder rolls, but also serving as a supplemental part of the lower concaved structure in order to yieldingly drive the ends of the leaves and stuff between the upper ends of the main concave and the scraper knives. Each member 12 has a lever such as $23^A$ attached thereto and a spring 23 for throwing one edge of the member 12 up against a coöperating roll for the purpose of scraping the roll.

Figure 1:
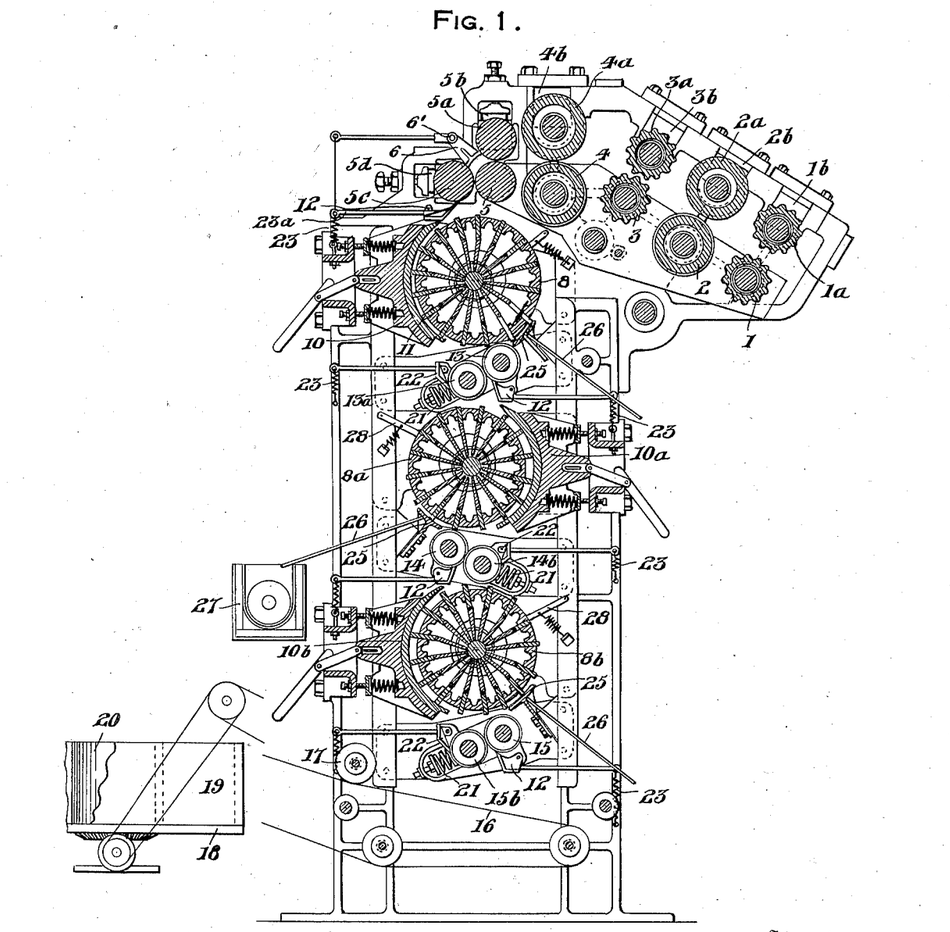
Figure 1 is a vertical sectional view taken through the center of a machine embodying my invention.

From the foregoing it will be seen that the material passes from the holder rolls 5—$5^c$ against the face of the member 12 and then between the cylinder 8 and the corresponding concave 10. From the lower end of the concave 10 into a passage between a set of blank holding rolls 13—$13^a$ from which it passes to the concave $10^a$ and cylinder $8^a$ to the holding rolls 14—$14^b$ to the cylinder $8^b$ and then to the holding rolls 15—$15^b$. Beneath the rolls 15—$15^b$ is a belt conveyer 16 onto which the material is delivered by the rolls 15—$15^b$. The conveyer delivers the material to a revolving table or receptacle 18. The table 18 comprises a cylindrical outer wall 19 and also has a cylindrical inner vertical wall 20 concentric with the vertical outer wall 19, thus providing an annular space for the reception of the fiber delivered to the table by the conveyer 16. By driving the table so that it revolves with the same linear speed as the linear speed of the conveyer, I find that the fiber is automatically laid closely in the annular space above the table, the fibers being automatically arranged parallel.

It will be necessary to state that I drive the rolls 1—$1^a$, 2—$2^a$, 4—$4^a$, 5—$5^b$, $5^c$, 13—$13^a$, 14—$14^b$ and 15—$15^b$ all at the same linear speed and also at the same linear speed as the conveyer 16 and the table 18. However, the rolls 3—$3^a$, 8—$8^a$ and $8^b$ are driven at a higher surface speed in order to obtain the desired rubbing and scraping action against the material.

It will be seen that each of the rolls $13^a$, $14^b$, and $15^b$, are resiliently mounted, being pushed toward the rolls 13, 14 and 15 respectively by springs such as 21. Moreover, each of the rolls $13^a$, $14^b$, and $15^b$, has a hinged scraper such as 22 bearing on the face thereof to prevent the fiber from wrapping around them and the accumulation on the surface of a coating of waste material. The scrapers are similarly mounted on pivots, thrown against the corresponding rolls by means of a spring such as 23. However, the members 12 not only serve a similar purpose as scrapers 22, but also serve as supplemental portions of the concave structure as previously mentioned.

Each of the rolls, 8, $8^a$ and $8^b$ carries a plurality of scraper blades such as 11 which serve to scrape the fibers and remove therefrom the waste material. Since the blades 11 move faster than the fibers, the ends of the fibers or the butts of the leaves and stalks being treated are whipped around by the blades just as the butt ends are leaving a particular concave and carried over against a fixed finishing concave member such as 25 against which the knives bear strongly and thus the butts are given a particularly forcible scraping. As the knives leave the member 25, they are being retracted toward the surface of the corresponding roll and consequently the waste material which has been gathered by the knives from the leaves and stalks is thrown off the knives immediately above the member 25 and this waste material is caught by waste chutes such as 26 and delivered by the chutes into conveyers such as 27, only one conveyer being illustrated in the drawing although it will be understood that one is provided for each of the chutes 26.

I provide also for each roll such as 8, $8^a$ and $8^b$ a cleaning scraper such as 28 which is spring pressed against the face of the corresponding roll just at the point where the knives come flush with the surface of the roll and consequently the faces of the knives and rollers are cleaned by the scrapers 28 at the same time.

Figure 4:
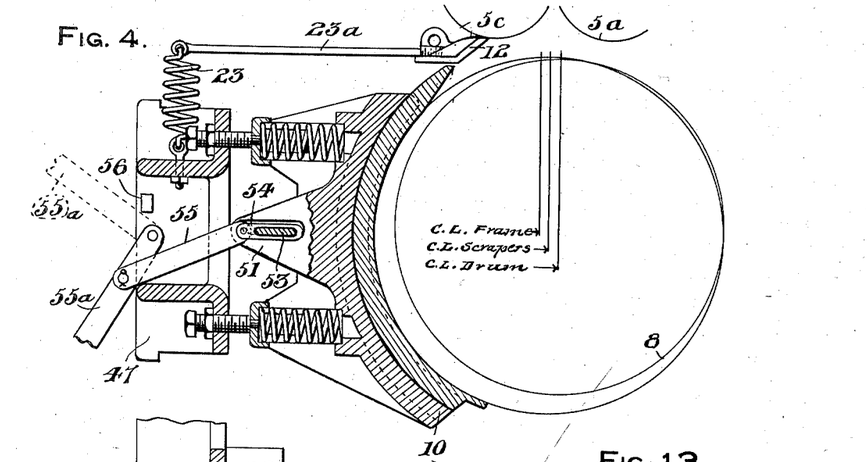
Fig. 4 is a sectional elevation of a concave used in connection with my scraping rollers with the structure for supporting the concave and showing certain coöperating parts diagrammatically.
Figure 9:
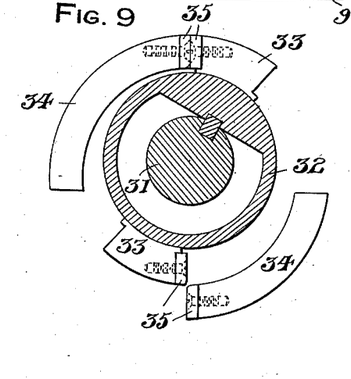
Fig. 9 is a sectional elevation taken at right angles to Fig. 8 showing certain of the details appearing in Fig. 8 and illustrating the manner of driving the scraping rolls from the shaft thereof.
Figure 10:
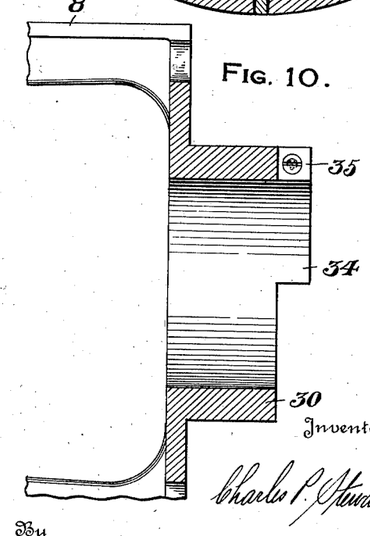
Fig. 10 is a sectional elevation taken parallel to Fig. 8 but showing only the end of the scraping roll and illustrating in detail the parts which coöperate with the driving part on the shaft.
Figures 12, 13, 14:
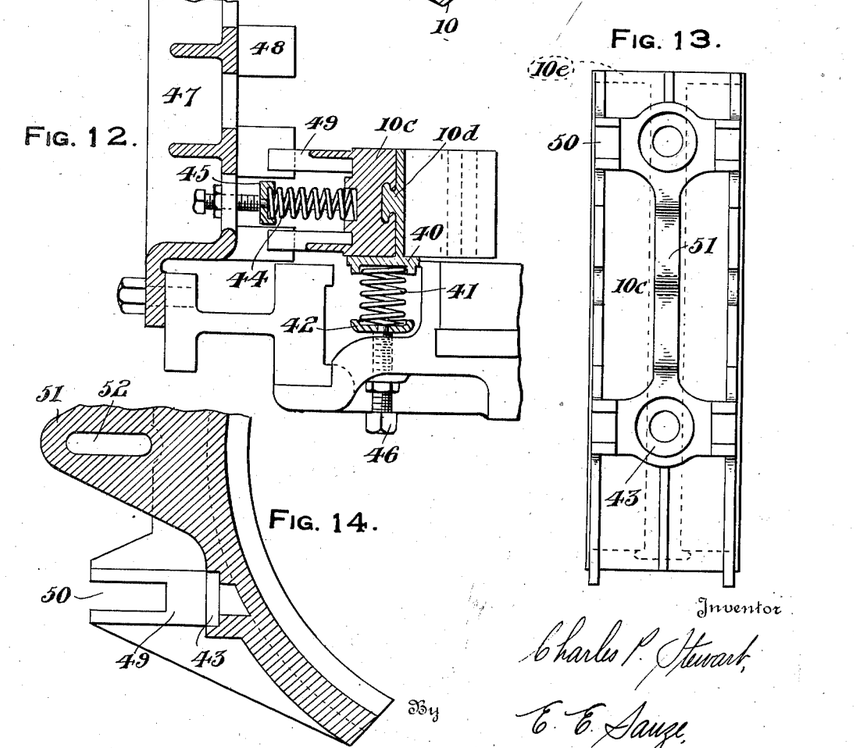
Fig. 12 is a sectional elevation of the concave and supporting structure taken at right angles to Fig. 4.
Fig. 13 is an elevational view of the back of one of the concave elements.
Fig. 14 is an enlarged detail of a portion of one of the concave elements taken on the same line as Fig. 4.

Referring more particularly to Fig. 4, it will be noted that the scraper rolls or drums are mounted eccentrically within a circular opening in the frame of the machine and also that the scraping knives revolve about a different center from the center of the drum. The arrangements by which this is accomplished are particularly illustrated in Figs. 8, 9 and 10. Each of the rolls or drums 8 has a projecting flange or annular hub such as 30 at both ends, the hub 30 revolving in journals in the same. Passing through the hub 30 eccentrically thereto are shafts such as 31 and keyed to the shafts 31 as illustated in Fig. 9 are small cylinders such as 32 on each of which are fixed two dogs such as 33 which coöperate with cams such as 34 formed on the ends of the hub 30 so as to rotate the outer drums or rolls. I provide both the dogs 33 and cams 34 with wearing plates such as 35 which are hardened material and which may be renewed from time to time, this being necessary owing to the considerable friction developed at the driving surfaces due to the combined rotative and radial movements.

Figures 2, 6, 11:
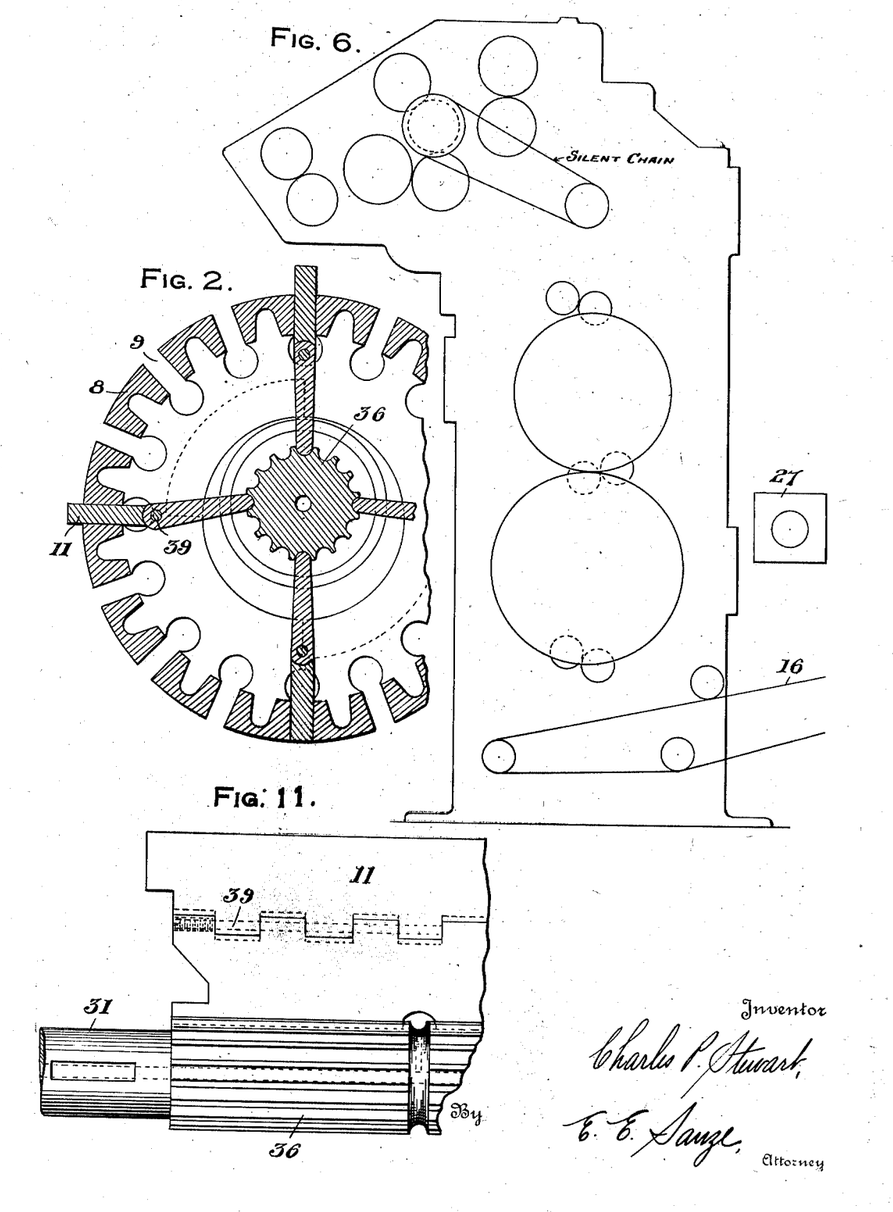
Fig. 2 is a detailed sectional elevation of one of the scraping rolls with the scrapers assembled therein.
Fig. 6 is an elevational view of the right hand end of my machine, the parts being indicated diagrammatically.
Fig. 11 is an elevational view of the scraper and shaft structure shown in Fig. 2.
Figure 3:
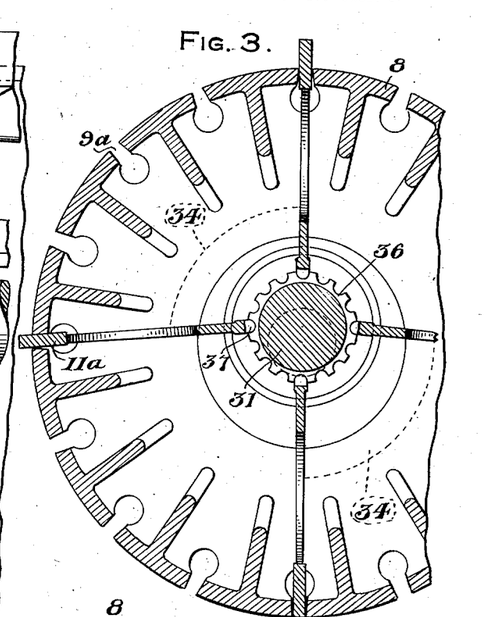
Fig. 3 is a view similar to Fig. 2 showing a modified arrangement of the scrapers.

The shafts 31 extend throughout the length of the individual rolls such as 8 and carry thereon within the rolls a number of fluted sections such as 36 and the inner ends of the scrapers or blades such as 11 set into the hollows or recesses in the portions 36. It will be seen from Figs. 2 and 3 that I may use jointed or hinged scraper members 11 or radial scrapers 11ª, Fig. 3 illustrating form 11ª to show the way in which the same is retracted even with the surface of the roll 8 showing the revolution of the roll. It will be understood that the same arrangement is used for this purpose with both the forms 11 and 11ª. At the extreme ends of the members 11 and 11ª, they are provided with projections 37 at the points where the members 11ª come in contact with one of the sections 36. The cylinder 32 moreover is provided with an inwardly projecting flange 38 which extends over and around the projection 37 thus forcing them to remain next to the shaft or fluted section 36 on the shaft. It will be understood that the members 11 and 11ª are forcibly extended during the revolution of the roll owing to the eccentricity between the center of rotation of the shaft 31 and roll 8. Referring more particularly to Fig. 2, it will be seen that the scraping members 11 shown therein are hinged at 39 so that the outer ends thereof may work in radial slots such as 9, the offset between the outer and inner ends being taken up by the hinge 39. The radial arrangement shown in Fig. 2 is the preferred form, since it permits more even and uniform operation of the scrapers against the fiber. However, if desired, the arrangement shown in Fig. 3 may be used in which the offset during the rotation of the roll 8 is permitted owing to the use of slots 9ª in the roll which enlarge in passing from the surface of the roll toward the center, as plainly shown in the figure.

The concave structure and mounting is more particularly illustrated in Figs. 4, 12, 13 and 14. The concaves such as 10 are complex structures comprising individual concave members such as 10ᶜ, a plurality of the members 10ᶜ being arranged side by side in a direction parallel to the axis of one of the rolls or scrapers such as 8 and the inner face of a concave member such as 10ᶜ which is preferably fitted with an inner wearing shoe such as 10ᵈ of bronze or other material which will not discolor the fiber. The parts 10ᶜ and 10ᵈ are provided with complemental tongue and groove portions and the part 10ᵈ has cast at the upper end thereof an overlapping top portion 10ᵉ shown in dotted lines in Fig. 13 so that the parts can be readily assembled and disassembled. Moreover, the part 10ᵈ which is at the end of a given set of concaved elements has cast thereon a side piece such as 40, having sockets cast therein to accommodate springs such as 41, the other end of which bear against adjustable sockets 42, the springs 41 serving to force the individual elements 10ᵈ together. Members 10ᶜ are cast with sockets such as 43 on their backs to accommodate one end of springs such as 44, the other ends of the springs 44 being held by the adjustable sockets 45, the springs 44 serving to force the concave elements 10ᶜ toward the scraping rolls. It will be seen that the adjustable sockets 42 and 45 can be adjusted by means of screws such as 46. The weight of the members 10ᶜ and 10ᵈ is supported by a frame member or bar such as 47 which extends parallel to the rolls such as 8 and which is provided with a series of lugs such as 48. The members 10ᶜ have fastened thereon a plurality of lugs 49 which are milled out to provide slots such as 50 into which the members 48 extend so that the members 10ᶜ are slidably mounted. In order to withdraw all the members 10ᶜ from contact with the corresponding scraping knives, I provide lugs such as 51 on members 10ᶜ, lugs 51 being apertured as at 52 to receive a bar 53 which extends through all the apertures 52. At about six inches from each end of the bar I place thereon a link 54 which is pivoted to a floating link 55, links 55 being pivoted in turn to a pivoted lever 55ª on the member 47. When the lever 55ª is in the full line position shown in Fig. 4, the springs 44 can force the concave against the scraper knives, but when lever 55ª is thrown over in dotted line position, the concave elements are all withdrawn from contact with the knives. A stop 56 is cast on the member 47 at some convenient place so as to hold the lever 55 in the off position.

Figures 5, 7:
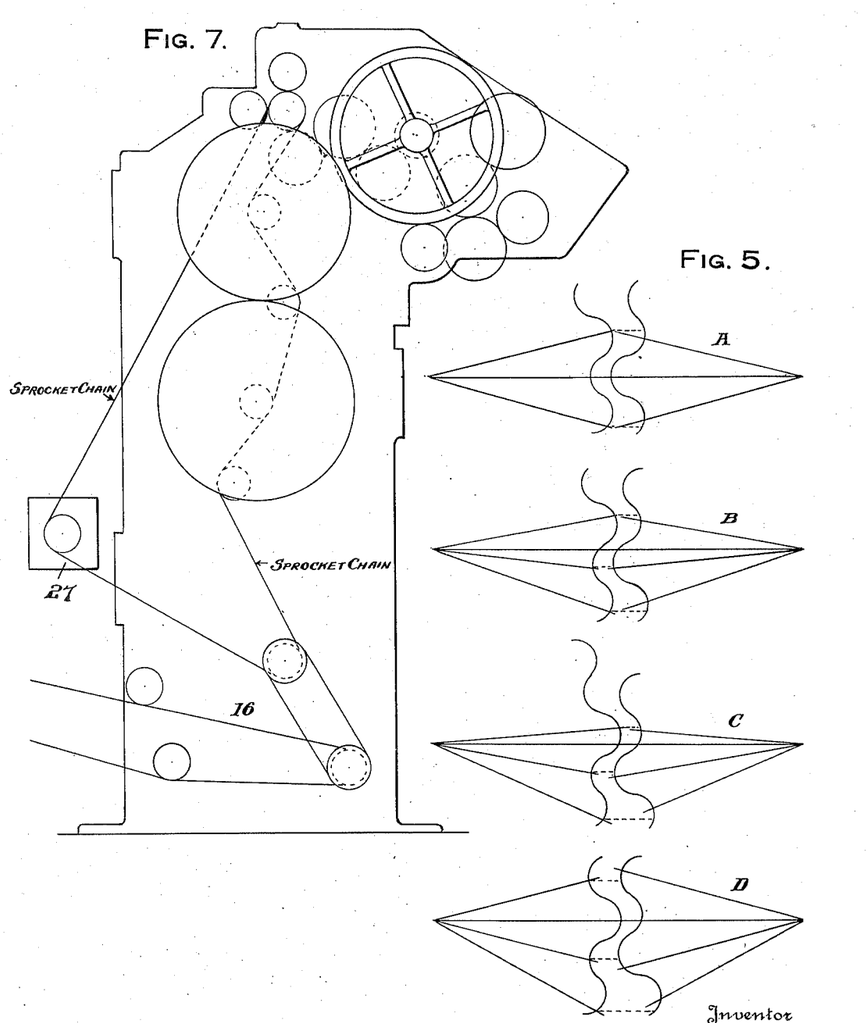
Fig. 5 shows further diagrams illustrating the action of the corrugations in certain of the crushing rolls used in my machine.
Fig. 7 is an elevational view of the left hand end of my machine, the parts in this view also being shown diagrammatically.

Referring more particularly to Figs. 6 and 7, it will be understood that the circles on the figures represent gear wheels. It is not thought necessary to give a detailed description of the arrangement of these gears, but I prefer that the gears shall be so arranged that the crushing rolls 3—3ª shall have a speed approximately 50% over the remainder of the crushing rolls such as 1—1ª. Moreover, as previously mentioned, the scraper rolls such as 8 travel at a faster rate of speed and work away from the holding action of the holder rolls. It will be understood moreover, that the corrugations of the longitudinally corrugated rolls such as 1—1ª and 3—3ª are so cut that they have a slight rolling motion which crushes and kneads the strip of material and tends to lessen the pulp and skin from the fiber.

The action of the longitudinally corrugated rolls is illustrated diagrammatically in detail in Fig. 5 in which Diagram A shows the corrugation in the position in which the recess of one roll and the projecting of the other roll are both on the center line between two rolls. Diagram B shows the roll when the right hand roll has taken slight advance over the left hand roll. Diagram C shows a still greater advance of the right hand roll over the left hand roll, Diagram D shows the maximum advance of one roll over the other or one half of a complete cycle.

It will be understood that the liquid waste material is practically all disposed of in the preliminary crushing rolls 1—1ª to 5—5ª so that the liquid material may be readily collected in a pan (not shown) and disposed of in a convenient manner. It will be understood that this application is a substitution for my abandoned applications Nos. 573,373 and 634,443. It will be seen that those skilled in the art may depart from the particular arrangement and combination of parts with the precise details of the mechanism without departing from the scope of my invention.

Having thus described my invention, I claim:

1. In a machine for extracting and collecting vegetable fiber from fibrous material, the combination with a plurality of pairs of crushing rollers, of a plurality of pairs of holding rollers, a plurality of scraper rollers furnished each with radially withdrawable and projectable scraper blades, said holding rollers feeding the material to said scraper rollers, a plurality of coöperating concaves, provided for each scraper roller, a plurality of cleaner blades, one for each scraper roller, an endless conveyer receiving the fiber after it has been scraped, and a revolving collecting table upon which the fiber is delivered by said conveyer, substantially as specified.

2. In a machine for extracting and collecting vegetable fiber from fibrous material, the combination with a plurality of pairs of crushing rollers, of a plurality of pairs of holding rollers, a plurality of scraper rollers furnished each with radially withdrawable and projectable scraper blades, said holding rollers feeding the material to said scraper rollers, a plurality of coöperating concaves, provided for each scraper roller, a plurality of cleaner blades, one for each scraper roller, an endless conveyer receiving the fiber after it has been scraped, a revolving collecting table upon which the fiber is delivered by said conveyer, said concaves being alternately arranged on opposite sides of successive scraper rollers, substantially as specified.

3. In a machine for extracting and collecting vegetable fiber from fibrous material, the combination with a plurality of pairs of crushing rollers, of a plurality of pairs of holding rollers, a plurality of scraper rollers furnished each with radially withdrawable and projectable scraper blades, said holder rollers feeding the material to said scraper rollers, a plurality of coöperating concaves, provided for each scraper roller, a plurality of cleaner blades, one for each scraper roller, an endless conveyer receiving the fiber after it has been scraped, a revolving collecting table upon which the fiber is delivered by said conveyer, said concaves being alternately arranged on opposite sides of successive scraper rollers, and said cleaner blades being alternately arranged on opposite sides of the scraper rollers, substantially as specified.

4. In a machine for extracting and collecting vegetable fiber from fibrous material, the combination with a plurality of pairs of crushing rollers, of a plurality of pairs of holding rollers, a plurality of scraper rollers furnished each with radially withdrawable and projectable scraper blades, said holding rollers feeding the material to said scraper rollers, a plurality of coöperating concaves provided for each scraper roller, a plurality of cleaner blades, one for each scraper roller, an endless conveyer receiving the fiber after it has been scraped, and a revolving collecting table upon which the fiber is delivered by said conveyer, said pairs of crushing rollers being horizontally disposed side by side, and said scraper rollers being arranged one above another in an upright stack, substantially as specified.

5. In a machine for extracting and collecting vegetable fiber from fibrous material, the combination with crushing rollers and cylindrical scraper rollers furnished with radially and positively withdrawable and projectable scraper blades and stationary concave surfaces with which the blades coöperate when projected beyond the periphery of the scraper rollers, and stationary cleaning surfaces operating upon the side of said rollers at the side thereof where the scraper blades are withdrawn.

6. In a machine for extracting and collecting vegetable fiber from fibrous material, the combination with crushing rollers, of cylindrical scraper rollers furnished with radially and positively withdrawable and projectable scraper blades, coöperating concaves provided for each scraper roller, and means for adjusting said concaves to and from the scraper rollers, substantially as described.

7. In a machine for extracting and collecting fiber from fibrous material, the combination with crushing rollers, scraper rollers and holding rollers, of a conveyer and a collecting table, said scraper rollers having radially withdrawable and projectable scraper blades, and cleaner blades arranged to engage the said scraper rollers and said scraper blades when the blades are withdrawn flush with the periphery of the scraper rollers, substantially as specified.

8. In a machine for extracting and collecting fiber from fibrous material, the combination with a scraper roller having a plurality of radially withdrawable and projectable scraper blades, of a shaft within said scraper roller for operating said blades, said shaft having its axis eccentric to the axis of the scraper roller, said roller and shaft having interengaging clutch or connecting devices to cause them to rotate together, and bodily slidable spring pressed concaves coöperating therewith.

9. In a machine for extracting and collecting fiber from fibrous material, the combination with a scraper roller having a plurality of radially withdrawable and projectable scraper blades, of a shaft within the said scraper roller for operating said blades, said shaft having its axis eccentric to the axis of the scraper roller, said blades having each pivot members at their inner edges, and ring members fitting over the pivot members of said blades to pivotally connect the same to said shaft, substantially as specified.

10. In a machine for extracting and collecting fiber from fibrous material, the combination with a plurality of crushing rollers arranged in a horizontally disposed series of upright pairs, of cylindrical scraper rollers having radially and positively projectable and withdrawable scraper blades arranged one above another in an upright stack, and a further crushing roller arranged and disposed to form a horizontal pair with one of said first-mentioned crushing rollers and a curved guide for deflecting the fibrous material from its horizontal path in moving between the crushing rollers to a substantially upright path as it passes between the final pair of crushing rollers into engagement with the scraper rollers.

11. In a machine for extracting and collecting fiber from fibrous material, the combination with a plurality of crushing rollers arranged in a horizontally disposed series of upright pairs, of cylindrical scraper rollers having withdrawable blades arranged one above another in an upright stack, and a further crushing roller arranged and disposed to form a horizontal pair with one of said first-mentioned crushing rollers and a curved guide for deflecting the fibrous material from its horizontal path in moving between the crushing rollers to a substantially upright path as it passes between the final pair of crushing rollers into engagement with the scraper rollers, concaves alternately arranged on opposite sides of said scraper rollers, cleaner blades alternately arranged on opposite sides of said scraper rollers, and holder rollers arranged in pairs between successive scraper rollers, substantially as described.

12. In a machine for extracting and collecting fiber from fibrous material, the combination with crushing rollers, of cylindrical scraper rollers and holding rollers, means for driving the crushing rollers and holding rollers at the same surface speed, and means for driving the scraper rollers at a higher surface speed, and means for driving said conveyer at the same surface speed as the crushing and holding rollers, and a revolving collecting table, and means for driving the collecting table at the same surface speed as the crushing and holding rollers and conveyer.

13. In a machine for extracting and collecting the fiber from fibrous material, the combination with crushing rollers, of cylindrical scraper rollers arranged one above another, and holder rollers in pairs between successive scraper rollers, said pairs of holder rollers being journaled in inclined brackets and said brackets being successively alternately inclined, substantially as specified.

14. In a machine for extracting and collecting the fiber from fibrous material, the combination with a scraper roll having radially arranged scraper blades, of a sectional concave element coöperating with the said roll, said elements being bodily movable and yieldably controlled.

15. In a machine for extracting and collecting the fiber from fibrous material, the combination with a scraper roll having radially arranged scraper blades, of a sectional concave element coöperating with the said roll, said element being bodily movable and yieldably controlled, a hinged scraper coöperating with and supplementing said concave element, and a pair of holder rolls coöperating with said hinged part, and said concave element.

16. In a machine for extracting and collecting fiber from fibrous material, including in combination crushing rolls; a cylindrical shaped scraper roll furnished with radially arranged positively withdrawable and projectable scraper blades; a bodily slidable, spring controlled concave coöperating with said scraper roll and normally equally pressed against the scraper blades throughout its inner face, substantially as specified.

17. A machine for extracting and collecting fiber from vegetable fibrous material including in combination, crushing rolls; a series of cylindrical scraper rolls each furnished with radially arranged and positively withdrawable and projectable scraper blades; a series of bodily movable, yieldably controlled concaves, provided for each scraper roll; coöperating with said scraper rolls, said concaves having all parts thereof pressed equally toward the rolls, substantially as specified.

18. A machine for extracting and collecting fiber from fibrous material including in combination, crushing rolls, a series of cylindrical scraper rolls, each furnished with radially arranged and positively retractable and projectable scraper blades and arranged in a vertical series and operating in succession upon the material; and a series of bodily slidable spring pressed concave elements; and springs pressing the concaves until parts thereof press with uniform pressure against the scraper blades.

19. A machine for extracting and collecting fiber from fibrous material including in combination: crushing rolls, a series of cylindrical scraper rolls, arranged in a vertical series, a series of bodily slidable spring-pressed concaves coöperating with said scraper rolls, and means for feeding material from the crusher rolls through the scraper rolls and concaves, substantially as specified.

20. A machine for extracting and collecting fiber from fibrous material including in combination: crushing rolls; a vertically arranged series of scraper rolls acting successively on the material and each provided with positively retractable and projectable scraper blades; and a plurality of bodily slidable, yieldably controlled concaves coöperating with said scraper rolls, there being one set of concaves for each scraper roll and said concaves being arranged on opposite sides of alternate scraper rolls, substantially as specified.

21. A machine for extracting and collecting fiber from fibrous material including in combination, crushing rolls; a series of scraper rolls arranged to act successively on the material; a plurality of movable, spring controlled concave structures coöperating with said rolls, there being one concave structure for each roll; and a pair of holder rolls above each of said scraper rolls; one of the holder rolls of each pair being normally yieldingly pressed toward its mate, the pairs of holder rolls being arranged at an incline and serving both to feed and regulate the speed of the material.

22. A machine for extracting and collecting fiber from fibrous material including in combination, crushing rolls, a series of cylindrical scraper rolls acting on the material successively, bodily movable spring pressed concaves, one set for each of said scraper rolls and coöperating therewith; and a pair of holder rolls, one of said holder rolls being movably mounted and yieldably pressed toward its mate and furnished with a scraper device adapted to clean it of any adhering material, substantially as specified.

23. The combination in a machine for extracting and collecting fibrous material, of crushing rolls, a series of scraper rolls arranged in vertical series and acting successively on the material, holder rollers below the scraper rolls, a conveyer receiving the material from the lower pair of holder rolls, and a table upon which the conveyer delivers the fiber, such table having a revolving movement.

24. In a decorticating apparatus, in combination a slotted cylinder, and radially extensible and retractable scrapers mounted in said cylinder, said scrapers being hinged intermediate their ends.

25. In a decorticating apparatus in combination, a plurality of scraper blades, a sectional concave element coöperating with said blades, and means for withdrawing said concave element from contact with said scraper blades.

26. In a decorticating apparatus in combination, a plurality of scraper blades, and a plurality of concave elements coöperating with said blades and arranged side by side longitudinally of said blades.

27. In a decorticating machine in combination a plurality of scraper blades, and a plurality of concave elements coöperating with said blades, and arranged side by side longitudinally of said blades, said elements being spring pressed.

28. In a decorticating machine in combination a plurality of scraper blades, and a plurality of concave elements coöperating with said blades, and arranged side by side longitudinally of said blades, said elements being spring pressed, and means for withdrawing an entire tier of elements from contact with said coöperating blades at once.

29. In a machine for extracting and collecting vegetable fiber from fibrous material, the combination with crushing rollers, of cylindrical scraper rollers furnished with radially and positively withdrawable and projectable scraper blades, and coöperating concaves, provided for each scraper roller, said concaves being alternately arranged on opposite sides of successive scraper rollers, substantially as specified.

30. In a machine for extracting and collecting vegetable fiber from fibrous material, the combination with crushing rollers, of cylindrical scraper rollers furnished with radially and positively withdrawable and projectable scraper blades, and holder rollers, substantially as specified.

31. In a machine for extracting and collecting vegetable fiber from fibrous material, the combination with crushing rollers, of cylindrical scraper rollers furnished with radially and positively withdrawable and projectable scraper blades, coöperating concaves, one set for each scraper roller, and holder rollers, substantially as specified.

32. In a machine for extracting and collecting vegetable fiber from fibrous material, the combination with crushing rollers, of cylindrical scraper rollers furnished with radially and positively withdrawable and projectable scraper blades, and coöperating concaves, one set for each scraper roller, said concaves being alternately arranged on opposite sides of successive scraper rollers, and holder rollers, substantially as specified.

33. In a machine for extracting and collecting vegetable fiber from fibrous material, the combination with crushing rollers, of cylindrical scraper rollers furnished with radially and positively withdrawable and projectable scraper blades, and cleaner blades, one for each scraper roller, substantially as specified.

34. In a machine for extracting and collecting vegetable fiber from fibrous material, the combination with crushing rollers, of cylindrical scraper rollers furnished with radially and positively withdrawable and projectable scraper blades, and coöperating concaves, one set for each scraper roller, and cleaner blades, one for each scraper roller, substantially as specified.

35. In a machine for extracting and collecting vegetable fiber from fibrous material, the combination with crushing rollers, of cylindrical scraper rollers furnished with radially and positively withdrawable and projectable scraper blades, coöperating concaves provided for each scraper roller, said concaves being alternately arranged on opposite sides of successive scraper rollers, and cleaner blades, one for each scraper roller, substantially as specified.

36. In a machine for extracting and collecting vegetable fiber from fibrous material, the combination with crushing rollers, of cylindrical scraper rollers furnished with radially and positively withdrawable and projectable scraper blades, and holder rollers, and cleaner blades, one for each scraper roller, substantially as specified.

37. In a machine for extracting and collecting vegetable fiber from fibrous material, the combination with crushing rollers, of cylindrical scraper rollers furnished with radially and positively withdrawable and projectable scraper blades, coöperating concaves, provided for each scraper roller, holder rollers, and cleaner blades, one for each scraper roller, substantially as specified.

38. In a machine for extracting and collecting fiber from fibrous material, a cylindrical scraper roller having a plurality of radially and positively withdrawable and projectable blades, in combination with coöperating concaves and a cleaner blade, substantially as specified.

39. In a machine for extracting and collecting fiber from fibrous material, a cylindrical scraper roller having a plurality of radially and positively withdrawable and projectable blades, in combination with coöperating concaves, a cleaner blade, and a pair of holder rollers, substantially as specified.

40. In a machine for extracting and collecting fiber from fibrous material, the combination with a scraper roller having a plurality of radially withdrawable and projectable scraper blades, of a shaft within said scraper roller for operating said blades, said shaft having its axis eccentric to the axis of the scraper roller, said blades having each pivot members at their inner edges and rings furnished fitting over the pivot members of said blades to pivotally connect the same to said shaft, and said shaft having grooves to receive the inner edges of said blades, substantially as specified.

41. In a machine for extracting and collecting fiber from fibrous material, the combination with a plurality of crushing rollers arranged in a horizontally disposed series of upright pairs of cylindrical scraper rollers having each a plurality of radially and positively withdrawable and projectable scraper blades and arranged one above another in an upright stack, and a further crushing roller arranged and disposed to form a horizontal pair with one of said first mentioned crushing rollers. and a curved guide for deflecting the fibrous material from its horizontal path in moving between the crushing rollers to an upright path as it passes between the final pair of crushing rollers into engagement with the scraper rollers, and concaves alternately arranged on opposite sides of said scraper rollers, substantially as specified.

42. In a machine for extracting and collecting fiber from fibrous material, the combination with a plurality of crushing rollers arranged in a horizontally disposed series of upright pairs, of cylindrical scraper rollers having each a plurality of radially and positively withdrawable and projectable scraper blades and arranged one above another in an upright stack, and a further crushing roller arranged and disposed to form a horizontal pair with one of said first mentioned crushing rollers, and a curved guide for deflecting the fibrous material from its horizontal path in moving between the crushing rollers to an upright path as it passes between the final pair of crushing rollers into engagement with the scraper rollers, concaves alternately arranged on opposite sides of said scraper rollers, and cleaner blades alternately arranged on opposite sides of said scraper rollers, substantially as specified.

43. In a machine for extracting and collecting fiber from fibrous material, the combination with a plurality of crushing rollers arranged in a horizontally disposed series of upright pairs, of cylindrical scraper rollers having each a plurality of radially and positively withdrawable and projectable scraper blades and arranged one above another in an upright stack, and a further crushing roller arranged and disposed to form a horizontal pair with one of said first mentioned crushing rollers, and a curved guide for deflecting the fibrous material from its horizontal path in moving between the crushing rollers to an upright path as it passes between the final pair of crushing rollers into engagement with the scraper rollers, concaves alternately arranged on opposite sides of said scraper rollers, cleaner blades alternately arranged on opposite sides of said scraper rollers, holder rollers arranged in pairs between successive scraper rollers, one holder roller of each pair having a backing spring to cause it to exert a yielding pressure on the material, substantially as specified.

44. In a machine for extracting and collecting fiber from fibrous material the combination with crushing rollers, of cylindrical scraper rollers having a plurality of radially and positively withdrawable and projectable scraper blades, stationary concaves coöperating with said scraper blades when projected beyond the periphery of the rollers and holding rollers, means for driving the crushing rollers and holding rollers at the same surface speed and means for driving the scraper rollers at a higher surface speed, substantially as specified.

45. In a machine for extracting and collecting fiber from fibrous material, the combination with crushing rollers, of cylindrical scraper rollers having each a plurality of radially and positively withdrawable and projectable scraper blades, stationary concaves coöperating with said scraper blades when projected beyond the periphery of the rollers and holding rollers, means for driving the crushing rollers and holding rollers at the same surface speed and means for driving the scraper rollers at a higher surface speed, a conveyer and means for driving said conveyer at the same surface speed as the crushing and holding rollers, and a collecting table and means for driving the collecting table at the same surface speed as the crushing and holding rollers and conveyer, substantially as specified.

46. In a machine for extracting and collecting fiber from fibrous material, the combination with crushing rollers, of cylindrical scraper rollers and holding rollers, means for driving the crushing rollers and holding rollers at the same surface speed, means for driving the scraper rollers at a higher surface speed, and cleaner blades in coöperative arrangement with said scraper rollers, substantially as specified.

47. In a machine for extracting and collecting fiber from fibrous material, the combination with crushing rollers, of cylindrical scraper rollers and holding rollers, means for driving the crushing rollers and holding rollers at the same surface speed, means for driving the scraper rollers at a higher surface speed, and concaves in coöperative arrangement with said scraper rollers, said scraper rollers having each radially and positively withdrawable and projectable scraper blades, substantially as specified.

48. In a machine for extracting and collecting fiber from fibrous material, the combination with crushing rollers, of cylindrical scraper rollers and holding rollers, means for driving the crushing rollers and holding rollers at the same surface speed, means for driving the scraper rollers at a higher surface speed, concaves in coöperative arrangement with said scraper rollers, said scraper rollers having each radially and positively withdrawable and projectable scraper blades, and cleaner blades, one for each scraper roller, substantially as specified.

49. In a machine for extracting and collecting fiber from fibrous material, the combination with crushing rollers, of cylindrical scraper rollers having a plurality of radially and positively withdrawable and projectable scraper blades, stationary concaves coöperating with said scraper blades when projected beyond the periphery of the rollers arranged one above another and holder rollers in pairs between successive scraper rollers, said pairs of holder rollers being journaled in inclined brackets and said brackets being successively alternately inclined, substantially as specified.

50. In a machine for extracting and collecting vegetable fiber from fibrous material, the combination with crushing rolls, of a series of cylindrical scraper rolls each furnished with radially and positively withdrawable and projectable scraper blades, and a series of spring pressed sliding concaves one set for each scraper roll coöperating with said scraper rolls.

51. In a machine for extracting and collecting vegetable fiber from fibrous material, the combination with crushing rolls, of a series of cylindrical scraper rolls, each furnished with radially and positively withdrawable and projectable scraper blades, arranged in a vertical series and operating in succession upon the material, and a series of spring pressed sliding concaves provided for each of said scraper rolls.

52. In a machine for extracting and collecting vegetable fiber from fibrous material, the combination with crushing rolls, of a series of cylindrical scraper rolls, each furnished with radially and positively withdrawable and projectable scraper blades arranged in a vertical series and operating in succession upon the material, and a series of spring pressed sliding concaves provided for each of said scraper rolls and means for feeding the material from said crushing rolls through said scraper rolls and concaves.

53. In a machine for extracting and collecting vegetable fiber from fibrous material, the combination with crushing rolls, of a series of scraper rolls arranged in vertical series and acting successively on the material, each of said scraper rolls being furnished with radially and positively withdrawable and projectable scraper blades, and coöperating spring pressed sliding concaves provided for each of said scraper rolls, such concaves being arranged alternately on opposite sides of the scraper rolls.

54. In a machine for extracting and collecting vegetable fiber from fibrous material, the combination with crushing rolls, of scraper rolls furnished with radially and positively withdrawable and projectable scraper blades, coöperating spring pressed sliding concaves provided for each scraper roll, holder rolls below each scraper roll and stationary cleaner blades one for each scraper roll acting on the side of the roll where the blades are withdrawn and flush with its surface.

55. The combination with the scraping rolls and their concaves, of discharge chutes one for each roll, and concave surfaces 25 on to which the butt ends of the leaves are forced by the scraper rolls and upon which said ends are subjected to severe scraping as they ultimately pass down into the machine.

56. The combination with the scraping rolls and their concaves of discharge chutes one for each roll, and concave surfaces 25, said scraper rolls acting to force the butt ends of the leaves on to said surfaces 25 and to scrape the same as the leaves are ultimately drawn off said surfaces and down into the machine.

57. In a machine for extracting and collecting fiber from fibrous material, the combination with scraper rolls having radially withdrawable and projectable scraper blades, of spring pressed concaves coöperating with said rolls one set with each, and holder rolls one pair for each concave, said concaves being provided with hinged sections 12 at the top, adapted to engage said latter roller and serve as a scraper therefor.

In testimony whereof I affix my signature.

CHARLES P. STEWART.